3,025,307
2,5-BIS(2,3-EPOXYPROPOXYMETHYL)-TETRAHYDROFURAN

John D. Garber, Westfield, Robert E. Jones, Rahway, and Harold C. Reynolds, Plainfield, N.J., assignors to Merck & Co., Inc., Rahway, N.J., a corporation of New Jersey
No Drawing. Filed Sept. 10, 1958, Ser. No. 760,078
1 Claim. (Cl. 260—347.8)

This invention relates to epoxy compounds, and has for its object the provision of the new compound 2,5-bis (methylene glycidoxy) tetrahydrofuran which also has the name 2,5-bis (2,3-epoxypropoxymethyl) tetrahydrofuran and a process for producing the compound. The invention not only provides the monomer compound but various polymers thereof varying from the dimers and trimers up to and including the hard infusible resins. The intermediate resins are useful for adhesives, and the more completely condensed resins have general utility where thermosetting resins are useful.

In accordance with the process of the invention, 2,5-tetrahydrofurandimethanol is reacted with epichlorhydrin and in the presence of the catalyst, BF$_3$-etherate dissolved in ethyl ether. The 2,5-tetrahydrofurandimethanol may be produced by reacting 5-hydroxymethyl furfural with hydrogen at a pressure, for example, of about 4000 to 6000 p.s.i., at a temperature of from 150° to 175° C., in the presence of a copperchromite catalyst, according to the patent application of Torlief Utne, Robert E. Jones and John D. Garber, Serial No. 760,056, filed September 10, 1958 herewith. The reaction is believed to take place as follows:

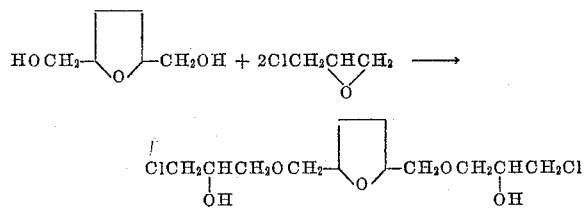

The dichloro compound of this reaction is dissolved in tetrahydrofuran, the acid is neutralized with potassium hydroxide, and the resulting diepoxy compound is produced. Care must be taken to maintain the compound as a monomer, since it will self-polymerize, at least to dimers and trimers, if the temperature is not kept low.

The following example illustrates a process carried out according to the invention:

Example 1

The following were mixed together in a flask: 2,5-tetrahydrofurandimethanol (44 g.), redistilled epichlorhydrin (61 g.) and 2 ml. of a 5% solution of BF$_3$-etherate dissolved in ethyl ether. The temperature rose slowly to 50° C. over 10 min. and then rapidly (10 sec.) to 100° C. The temperature was controlled by an ice bath and then stirred for 30 min. at 30° C. The volatile components were removed at 3 mm. Hg pressure to leave 105 g. of the dichloro compound of the above reaction product (100% of theory) with the following analysis: Cl—calc. 22.4%, found 21.5%.

To prepare the diepoxy compound, the dichloro derivative was dissolved in tetrahydrofuran (52 g. in 150 ml.) and 40 g. of powdered KOH added in about 5 g. portions, maintaining vigorous agitation. The slurry became warm, and after one hour was heated to reflux for one hour. After the slurry was cooled to room temperature and filtered with the aid of diatomaceous earth, the filtrate was evaporated to 33% solids content using a warm water bath (not steam cone).

Using the method for epoxy equivalent described in Industrial and Engineering Chemistry, volume 45, Number 12, p. 2715 (1953), a value of 239 was obtained. This compares with a theoretical of 106, which means that the diepoxide compound was partially polymerized during even the mild reaction and work-up conditions described.

Although the diepoxy monomer 2,5-bis (methylene glycidoxy) tetrahydrofuran may be polymerized by using the standard polyamine cross-linking agents as used with other epoxy resins, it is possible to cure the diepoxy compound by heat alone.

The following examples illustrate the production of polymers of the invention:

Example 2

To make a laminate, 9.0 g. of diaminodiphenyl sulfone was added to 17.4 g. (dry solids basis) of the compound of Example 1 in a 33% tetrahydrofuran solution. Five pieces of Volan H #181 glass cloth was coated with the above clear solution and dried at 50° C. to a tacky state. A sandwich was formed and cured on a press under contact pressure at 150° C. for three hours. A hard, tough laminate was formed.

Example 3

A portion of the 33% resin solution of Example 2 was evaporated slowly and finally cured at 100° C. for several hours. A clear, hard, insoluble cake was formed. Addition of polyamine curing agents, e.g. triethylenetetramine, induced more rapid curing action but introduced more color into the final product.

We claim:
2,5-bis (2,3-epoxypropoxymethyl) tetrahydrofuran.

References Cited in the file of this patent

UNITED STATES PATENTS

| | | |
|---|---|---|
| 2,054,099 | Rothrock | Sept. 15, 1936 |
| 2,897,163 | Clark et al. | July 28, 1959 |
| 2,944,066 | Hawkins | July 5, 1960 |
| 2,957,889 | Hoaglin et al. | Oct. 25, 1960 |

FOREIGN PATENTS

| | | |
|---|---|---|
| 757,294 | Great Britain | Sept. 19, 1956 |

OTHER REFERENCES

Paquin: Epoxydverbindugen und Epoxydharze (1958), pages 138, 139 and 143.